2,767,037

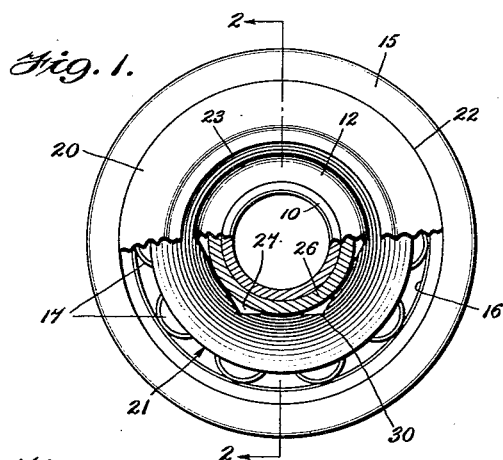
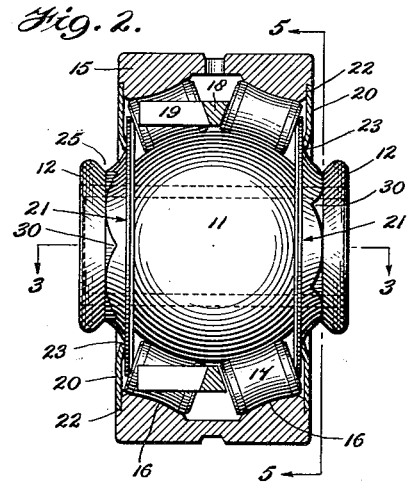
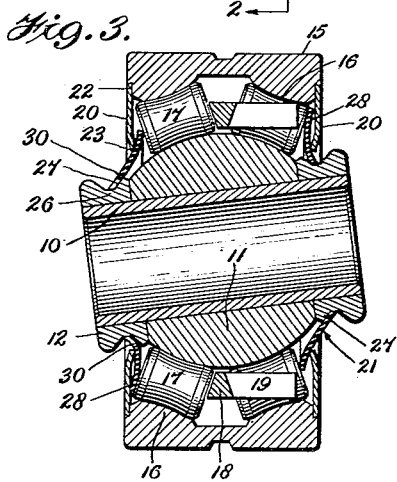
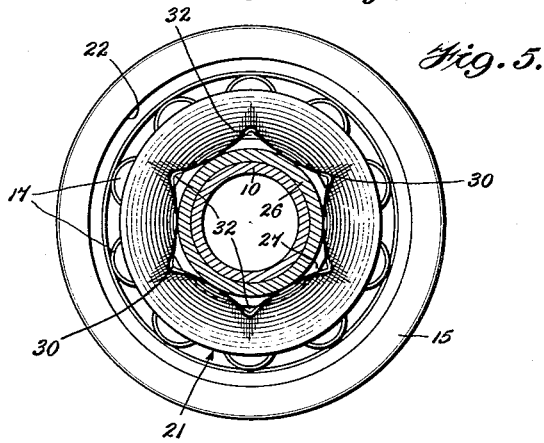
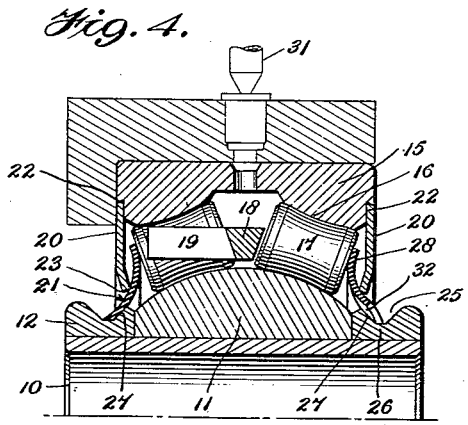
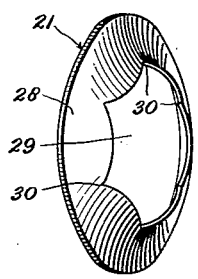
INVENTOR
Arthur H. Williams,

United States Patent Office 2,767,037
Patented Oct. 16, 1956

SEAL FOR ROTARY ANTI-FRICTION BEARINGS

Arthur H. Williams, Riverside, Ill., assignor to Chain Belt Company, Milwaukee, Wis., a corporation of Wisconsin Application February 9, 1954, Serial No. 409,038

2 Claims. (Cl. 308—187.2)

The invention relates to anti-friction bearings for rotating or oscillating shafts and has for its principal object the provision of an improved lubricant seal for such bearings.

In anti-friction shaft bearings of the ball and roller types it is common practice to provide sealing devices at each end of the bearing for minimizing the escape of lubricant contained in the interior of the structure as well as the entry of dust and similar foreign matter to the bearing surfaces. In many instances the bearings are packed with grease or other suitable lubricant at the factory, but after they are placed into use it is necessary or highly desirable that such lubricant be replenished or replaced at regular intervals the length of which depends upon the type and/or severity of use to which the bearing is put.

For example, in the case of certain control mechanisms for aircraft instrumentalities the lubrication intervals may range up to 100 hours or more of flight, whereas in some other types of controls it is necessary to relubricate or "purge" the bearings after each few hours of flight if the functioning of the controls is to be reliably maintained. This purging is of particular importance where the relative angular movement between the parts is small, i. e., a few degrees, since under such conditions the balls or rollers of the bearings fail to transfer sufficient lubricant to their points of contact with the races to prevent friction, oxidation and mechanical fretting of the parts from occurring.

While bearing seals have been heretofore devised which have given quite satisfactory service insofar as exclusion of foreign matter and retention of lubricant within the bearing during normal operating conditions are concerned, trouble with the seals has developed frequently in connection with attempts to renew the lubricant. Purging usually is accomplished by means of a grease gun or a high pressure lubricating system, and numerous instances have occurred in the course of purging with such apparatus in which the seals have been blown or otherwise so damaged as to render them incapable of thereafter performing their intended functions. It is a prime object of the present invention to provide a seal construction which substantially completely eliminates this objection to the prior seals.

In the accompanying drawing forming a part of this specification there is illustrated a typical example of my improved seal as applied to a self-alining double row roller bearing of a form widely employed in aircraft control and other mechanisms; however, those skilled in the art will readily appreciate that the seal construction is not necessarily limited to this specific type of bearing and may be readily incorporated into various other known forms of anti-friction bearings.

In the said drawing:

Figure 1 is an end elevational view, partly broken away and in section, of a typical bearing equipped with the improved seals;

Fig. 2 is a vertical sectional view, partly in elevation, on the plane indicated by the line 2—2 in Fig. 1;

Fig. 3 is a horizontal sectional view on the plane indicated by the line 3—3 in Fig. 2, illustrating the action of the seals during misalinement of the inner and outer elements of the bearing;

Fig. 4 is an enlarged fragmentary sectional view, similar to Fig. 2, illustrating the action of the seals during a purging operation;

Fig. 5 is a sectional-elevational view on approximately the plane indicated by the line 5—5 in Fig. 2 and showing the seal during the purging as in Fig. 4; and Fig. 6 is a perspective view of one of the resilient sealing washers.

The bearing shown in the drawing comprises an inner race assembly including a sleeve 10 upon which is mounted a spheroidal race member 11 which is fixedly maintained in position by a pair of collars 12 press-fitted or otherwise rigidly secured to the sleeve. Since the members 10, 11 and 12 function as a unit they may be, and in some instances are, constructed as a single integral element. An annular outer race member 15 encircles the inner race member, and its inner circumference is provided with a spaced pair of raceways 16 of convex cross section, as shown in Figs. 2, 3 and 4. A circumferential series of concave rollers 17 is interposed between each raceway 16 and the spheroidal inner race member 11, which rollers are maintained in appropriate circumferentially spaced relation by an annular cage or spacing member 18 having laterally projecting fingers 19 interposed between adjacent rollers. This bearing structure is essentially the same as that shown in my prior U. S. Patents No. 2,387,962, granted October 30, 1945, and No. 2,619,369, granted November 25, 1952.

The seal construction constituting the gist of the present invention comprises a metal annulus 20 carried by the outer race member 15, and a lubricant-resistant artificial rubber or similar yieldable washer 21 carried by the inner race assembly and co-operating with said annulus. The outer peripheral portion of the annulus 20 is firmly seated and retained in a circular recess 22 formed in the end face of the outer race member 15 while the inner periphery of said annulus surrounds the collar 12 in spaced relation thereto. The said collar is provided with a circumferential groove 25 providing in the collar a circular neck 26 flanked by an outwardly extending shoulder 27, and the resilient washer 21 is mounted in said groove with the inner perimetral portion of its rearward face normally completely seated against the complementary face of the shoulder 27. The washer extends radially outward from the groove 25, intermediate the annulus 20 and the adjacent series of rollers 17, and the outer peripheral portion 28 of the washer engages the end surfaces of said rollers while a medial portion of the washer has a sliding contact with the inner periphery 23 of the annulus 20.

The inner perimetral portion of the flexible washer 21 is provided with circumferentially alternating areas of varying flexibility, in this instance accomplished as follows:

The central aperture 29 in the washer, instead of being circular whereby the inner perimeter of the washer would be in complete circumferential contact with the periphery of the neck 26 of the collar 12, is polygonal in shape, for example hexagonal as here shown. Thus, the material of the washer adjacent the corners 30 of the hole 29 does not extend to the full depth of the groove 25 and flexes more readily than does the material along the sides of the polygon. It results from this that when fresh lubricant is forced into the bearing, from the nozzle 31 of a grease gun or other pressure lubricating mechanism (Fig. 4), the washer material adjacent the corners 30 yields and the inner perimetral portion of the washer temporarily assumes a somewhat fluted condition, as indicated in Fig. 5, providing passages 32 between the washer and the shoulder 27 through which the old lubricant may readily escape without blowing, tearing or otherwise damaging the washer. When the purging is completed and the pressure from the lubricating device 31 is relieved, the resilience of the washer material restores the corner portions to contact with the shoulder 27, as at the left of Fig. 3, and the seal resumes its normal functions with unimpaired efficiency.

When misalinement between the inner and outer race members occurs, the sliding contact between the resilient washer 21 and the inward periphery 23 of the metal annulus 20 shifts, as indicated in Fig. 3, but is always maintained, as is the contact between the inner perimeter of the washer and the shoulder 27 of the collar 12.

As here shown the resilient washers 21 are slightly dished, but in the case of some forms of bearing they may be flat. In practice excellent results have been obtained from washers formed of a "Buna-N" impregnated fabric, which is highly grease resistant. The polygonal shape of the aperture in the washer also has the advantage of not inducing cutting or breaking of the fibers of the washer under the repeated oscillations incident to misalinements of the race members, thus lengthening the life of the washers materially.

What is claimed is:

1. In an anti-friction shaft bearing, an annular outer race member; an inner race member concentric therewith and provided with a circular neck flanked by an outwardly extending shoulder; rolling anti-friction members interposed between said race members; an annular seal member carried by said outer race member and having its inner periphery disposed adjacent said shoulder; and a flexible sealing washer mounted on and extending radially outward from said neck into sliding engagement with the inner periphery of said annular seal member, the inner perimetral portion of said flexible washer normally being seated against said shoulder and being provided with circumferentially alternating areas of varying flexibility, whereby pressure upon lubricant within the bearing may temporarily distort said inner perimetral portion of the washer to provide escape passages for the lubricant between the washer and shoulder.

2. In an anti-friction shaft bearing, an annular outer race member; an inner race member concentric therewith and provided with a circular neck flanked by an outwardly extending shoulder; rolling anti-friction members interposed between said race members; an annular seal member carried by said outer race member and having its inner periphery disposed adjacent said shoulder; and a resilient sealing washer mounted upon said neck with its inner perimetral portion normally completely seated against said shoulder, said washer extending radially outward from the neck into sliding engagement with the inner periphery of said annular sealing member, the central aperture of said washer being of polygonal shape to provide circumferentially alternating areas of varying flexibility in said inner perimetral portion of the washer, whereby pressure upon lubricant within the bearing may temporarily distort said inner perimetral portion to provide lubricant escape passages between the washer and shoulder.

References Cited in the file of this patent
UNITED STATES PATENTS

| | | |
|---|---|---|
| 1,292,799 | Kendall | Jan. 28, 1919 |
| 2,290,056 | Koubek | July 14, 1942 |
| 2,639,954 | Potter | May 26, 1953 |